United States Patent [19]

Curry

[11] Patent Number: 4,923,933

[45] Date of Patent: May 8, 1990

[54] POLYCARBONATE/POLYPHTHALATE CARBONATE BLENDS EXHIBITING GOOD FLAME RESISTANCE

[75] Inventor: Herbert L. Curry, Mt. Vernon, Ind.

[73] Assignee: General Electric Company, Pittsfield, Mass.

[21] Appl. No.: 294,718

[22] Filed: Jan. 6, 1989

[51] Int. Cl.$^5$ .................... C08F 20/00; C08L 69/00
[52] U.S. Cl. .................... 525/439; 525/464; 525/466
[58] Field of Search ............ 525/439, 466, 464, 474; 528/202

[56] References Cited

U.S. PATENT DOCUMENTS

| | | | |
|---|---|---|---|
| 3,929,908 | 12/1975 | Orlando et al. | 260/620 |
| 4,011,279 | 3/1977 | Berger et al. | 260/824 R |
| 4,170,711 | 10/1979 | Orlando et al. | 568/610 |
| 4,195,156 | 3/1980 | Bruckdorfer | 528/171 |
| 4,197,232 | 4/1980 | Bialous et al. | 260/37 PC |
| 4,387,193 | 6/1983 | Giles, Jr. | 525/431 |
| 4,476,294 | 10/1984 | Mark | 528/125 |
| 4,504,634 | 3/1985 | Miller et al. | 525/439 |
| 4,548,997 | 10/1985 | Mellinger et al. | 525/433 |
| 4,595,732 | 6/1986 | Ryang | 525/417 |

*Primary Examiner*—Theodore E. Pertilla
*Attorney, Agent, or Firm*—Spencer D. Conard

[57] ABSTRACT

Disclosed are blends of (a) an aromatic brominated polycarbonate; and (b) a polyphthalatecarbonate. Preferably, the blends also contain an amount of a silicone-polyimide. The blends exhibit good flame resistance and low smoke generation.

15 Claims, No Drawings

POLYCARBONATE/POLYPHTHALATE CARBONATE BLENDS EXHIBITING GOOD FLAME RESISTANCE

BACKGROUND OF THE INVENTION

This invention relates to polymeric blends which exhibit low flammability, low smoke generation, and high impact strengths. The polymer blends are particularly suited for the construction of aircraft interior panels and parts which must exhibit low flammability and low smoke generation characteristics.

Various requirements have been recently placed on the flame resistance and smoke generation of materials used in the construction of panels and parts for the interiors of commercial aircraft. Many thermoplastics have been unable to meet these flammability and smoke generation requirements. Exemplary flammability requirements include those set forth in the 1986 amendments to Part 25—Airworthiness Standards—Transport Category Airplanes of Title 14, Code of Federal Regulations (See 51 *Federal Register* 26206, July 21, 1986 and 51 *Federal Register* 28322, Aug. 7, 1986.) The flammability standards are based on heat colorimetry tests developed at Ohio State University and are described in the above-cited amendments to 14 C.F.R. Part 25 and are incorporated herein by reference.

An object of the present invention is to provide a polymeric blend having good flame resistance and low smoke generation.

SUMMARY OF THE INVENTION

The present invention provides a polymeric blend comprising in admixture a brominated aromatic polycarbonate, a polyphthalatecarbonate and preferably a silicone-polyimide. These blends have been found to exhibit good flame resistance and low smoke generation as required by established standards for materials used in the construction of aircraft interiors.

DETAILED DESCRIPTION OF THE INVENTION

Polycarbonates for use in the blends of the invention are high molecular weight, flame retardant, thermoplastic, brominated aromatic polymers which have average molecular weights of about 8,000 to more than 200,000, preferably of about 20,000 to 80,000 and an I.V. of 0.40 to 1.0 dl/g as measured in methylene chloride at 25° C. The brominated polycarbonates are preferably derived from brominated dihydric phenols and carbonate precursors. Alternatively, the brominated polycarbonates may be derived from a carbonate precursor and a mixture of brominated and non-brominated aromatic dihydric phenols. Suitable flame retardant brominated polycarbonates are set forth in Orlando, et al., U.S. Pat. No. 4,170,711 and Orlando, et. al., U.S. Pat. No. 3,929,908.

Suitable brominated dihydric phenols include those set forth in Orlando, U.S. Pat. No. 4,170,711, which include monomeric and polymeric halogenated organic compounds of the formula:

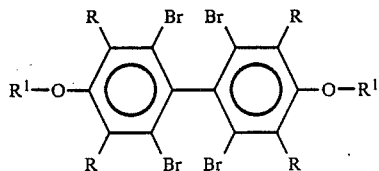

wherein each R independently is selected from primary alkyl groups, each $R^1$ is independently selected from hydrogen and organic groups, and at least one $R^1$ is an organic group.

Suitable brominated dihydric phenols include those set forth in Orlando, U.S. Pat. No. 3,929,908, which include 2,2′,6,6′-tetra-substituted p,p′-biphenols having the formula:

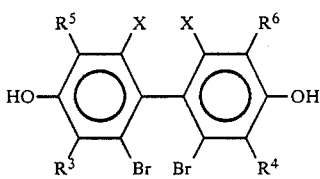

Preferred brominated dihydric phenols include 2,2-(3,5,3′,5′-tetrabromo-4,4′-dihydroxyphenyl)propane, and 2,2′,6,6′-tetramethyl-3,3′,5,5′-tetrabromo-4,4′biphenol.

Suitable non-brominated dihydric phenols for mixing with brominated dihydric phenols to produce brominated polycarbonates include dihydric phenols such as, for example, 2,2-bis(4-hydroxyphenyl)propane, bis(4-hydroxyphenyl)methane, 2,2-bis(4-hydroxy-3-methylphenyl)propane, 4,4-bis(4-hydroxyphenyl)heptane, and 3,3′-dichloro-4,4′-dihydroxydiphenyl)methane. Other dihydric phenols which are also suitable for use in the preparation of the above polycarbonates are disclosed in U.S. Pat. Nos. 2,999,835, 3,038,365, 3,334,154, and 4,131,575, incorporated herein by reference. Additional suitable non-brominated dihydric phenols are set forth below in the discussion of the polyphthalatecarbonate employed in the blends of this invention.

It is of course possible to employ mixtures of two or more different brominated and non-brominated dihydric phenols. In addition, branched brominated polycarbonates can also be utilized in the practice of this invention, as can blends of a linear brominated polycarbonate and a branched brominated polycarbonate.

The carbonate precursor employed can be a carbonyl halide. The carbonyl halides which can be employed are carbonyl bromide, carbonyl chloride and mixtures thereof. While other carbonate precursors will occur to those skilled in the art, carbonyl chloride, also known as phosgene, is preferred.

The polycarbonates of the subject blends can be manufactured by known processes, such as, for example, by reacting a brominated dihydric phenol, or a mixture of a brominated dihydric phenol and a non-brominated dihydric phenol, with a carbonate precursor such as diphenyl carbonate or phosgene in accordance with methods set forth in U.S. Pat. Nos. 4,081,750 and 4,123,436, as well as other processes known to those skilled in the art. If a mixture of dihydric phenols is employed, then preferably the mixture contains at least 25 percent of a brominated dihydric phenol, more preferably contains at least 50 mole percent of a brominated dihydric phenol so as to render a flame retardant brominated polycarbonate. Most preferably the polycarbonate is derived from a dihydric phenol composition which contains 100 mole percent brominated dihydric phenol.

The aromatic polycarbonates are typically prepared by employing a monofunctional molecular weight regulator, an acid acceptor and a catalyst. The molecular weight regulators which can be employed include phenol, cyclohexanol, methanol, alkylated phenols, such as octylphenol, paratertiary-butyl-phenol, etc. Preferably, pheonl or an alkylated phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkaline earth metal.

The catalysts which can be employed are those that typically aid the polymerization of the monomer with phosgene. Suitable catalysts include tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched brominated polycarbonates wherein a polyfunctional aromatic compound is reacted with the monomer and carbonate precursor to provide a thermoplastic randomly branched polycarbonate. The polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

The most preferred brominated polycarbonate is prepared from 2,2-(3,5,3',5'-tetra-bromo-4,4'-dihydroxyphenyl)propane and phosgene to produce a brominated polycarbonate resin which has repeating units which are generally represented by the formula:

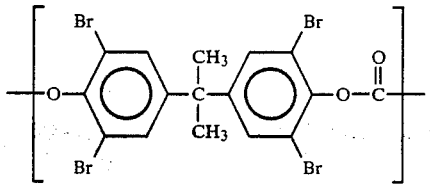

(III)

Known processes for polycarbonate preparation include melt processes and interfacial polymerization. Polyestercarbonates and the methods for their preparation are well known in the art as disclosed in U.S. Pat. Nos. 3,303,331; 3,169,121; 4,194,038 and 4,156,069, all of which are incorporated herein by reference. The polyphthalate carbonates employed in the present invention may be made by known methods for making polyestercarbonates.

The polyphthalatecarbonates can generally be termed polyesters containing carbonate groups, phthalate groups, and aromatic carbocyclic groups in the polymer chain. The polyphthalatecarbonate resins are in general, prepared by reacting a difunctional phthalic acid or a reactive derivative of the acid such as the acid dihalide, hereinafter referred to as a phthalate composition, a dihydric phenol and a carbonate precursor. Preferably the dihydric phenol and the combined moles of phthalte composition and carbonate precursor are in a mole ratio of from about 52:48 to 48:52 and more preferably about 50:50. Preferably the phthalate composition and the carbonate precursor are reacted in a mole ratio of from 90:10 to 60:40, more preferably from 80:20 to 65:35 and most preferably about 72:28.

The dihydric phenols useful in formulating the polyestercarbonates which are of use in the practice of the present invention are in general represented by the general formula:

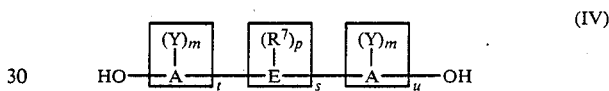

(IV)

wherein A represents an aromatic group such as phenylene, biphenylene, naphthylene, etc. E may be an alkylene or alkylidene group such as methylene, ethylene, propylene, propylidene, isopropylidene, butylene, butylidene, isobutylidene, amylene, isoamylene, amylidene, isoamylidene, etc. Where E is an alkylene or alkylidene group, it may also consist of two or more alkylene or alkylidene groups connected by a non-alkylene or non-alkylidene group such as an aromatic linkage, a tertiary amino linkage, an ether linkage, a carbonyl linkage, a silicon-containing linkage, or by a sulfur-containing linkage such as sulfide, sulfoxide, sulfone, etc. In addition, E may be a cycloaliphatic group (e.g., cyclopentyl, cyclohexyl, etc.); a sulfur-containing linkage, such as sulfide, sulfoxide or sulfone; an ether linkage, a carbonyl group; a tertiary nitrogen group; or a silicon-containing linkage such as silane or siloxy. Other groups which E may represent will occur to those skilled in the art. $R^7$ represents hydrogen or a monovalent hydrocarbon group such as alkyl (methyl, ethyl, propyl, etc.), aryl (phenyl, naphthyl, etc.), aralkyl (benzyl, ethylphenyl, etc.), or cycloaliphatic (cyclopentyl, cyclohexyl, etc.). Y may be an inorganic atom such as halogen (fluorine, bromine, chlorine, iodine), an inorganic group such as the nitro group, an organic group such as $R^7$ above, or an oxy group such as $OR^7$, it being only necessary that Y be inert to and unaffected by the reactants and reaction conditions. The letter m represents any interger from and including zero through the number of positions on A available for substitution; p represents an integer from and including zero through the number of positions on E available for substitution; t represents an integer equal to at least one; s is either zero or one; and u represents an integer including zero.

In the dihydric phenol compound represented by Formula IV, when more than one Y substituent is present, they may be the same or different. The same holds true for the $R^7$ substituent. Where s is zero in Formula IV and u is not zero, the aromatic rings are directly joined with no intervening alkylene or other bridge. The positions of the hydroxyl groups and Y on the aromatic nuclear residues A can be varied in the ortho, meta, or para positions and the groupings can be in a vicinal, asymmetrical or symmetrical relationship, where two or more ring carbon atoms of the hydrocarbon residue are substituted with Y and hydroxyl groups.

Some nonlimiting examples of dihydric phenols falling within the scope of Formula IV include:
2,2-bis(4-hydroxyphenyl)propane (bisphenol A);
2,4'-dihyroxydiphenylmethane;
bis(2-hydroxyphenyl)methane;
bis(4-hydroxyphenyl)methane;
bis(4-hydroxy-5-nitrophenyl)methane;
bis(4-hydroxy-2,6-dimethyl-3-methoxyphenyl)methane;
1,1-bis(4-hydroxyphenyl)ethane;
2,2-bis(3-phenyl-4-hydroxyphenyl)propane;
bis-(4-hydroxyphenyl)-cyclohexylmethane; and
2,2-bis(4-hydroxyphenyl)-1-phenylpropane.

These dihydric phenols may be used alone or as mixtures of two or more different dihydric phenols. The most preferred dihydric phenol is bisphenol A.

In general, the term difunctional phthalic acid is meant to include its reactive derivative such as the acid dihalide.

The phthalic acids which may be used as the phthalate composition in preparing the polyphthalatecarbonates useful in the practice of the present invention include isophthalic acid, terephthalic acid, and mixtures thereof.

Isophthalic acid is represented by the following formula:

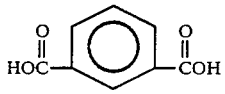

(V)

and terephthalic acid is represented by the following formula:

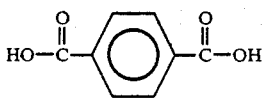

(VI)

More preferably the phthalate composition is a mixture of terephthalic acid and isophthalic acid in mole ratio of from about 6:94 to about 50:50 and most preferred is a mixture of terephthalic acid and isophthalic acid in a mole ratio of about 7:93.

The carbonate precursor may be either a carbonyl halide, a carbonate ester or a haloformate. The carbonyl halides which can be employed herein are carbonyl chloride, carbonyl bromide and mixtures thereof. Typical of carbonate esters which may be employed herein are diphenyl carbonate, di(halophenyl) carbonates such as di(chlorophenyl)carbonate, di(bromophenyl)carbonate, di(trichlorophenyl)carbonate, di(tribromophenyl)carbonate, etc., di(naphthyl)carbonate, di(chloronathyl)carbonate, phenyl tolyl carbonate, chlorophenyl chloronaphthyl carbonate, etc., or mixtures thereof. The haloformates suitable for use herein include bishaloformates of dihydric phenols (bischloroformates of hydroquinone, etc.) or glycols (bishaloformates of ethylene glycol, neopentyl glycol, polyethylene glycol, etc.). Carbonyl chloride, also known as phosgene, is most preferred.

Also present during the co-reaction between the dihydric phenol, the carbonate precursor and the phthalic acid or its reactive derivative are catalysts, molecular weight regulators, and acid acceptors. Examples of suitable molecular weight regulators include phenol, tertiary butyl phenol, etc. Examples of suitable catalysts include tertiary amines, quaternary ammonium compounds, quaternary phosphonium compounds, etc. Examples of suitable acid acceptors include tertiary amines, alkali or alkaline earth metal hydroxides, etc.

The polyphthalatecarbonate resins derived from dihydric phenols, phthalic acids or their reactive derivatives such as the phthalic acid dihalides, e.g., dichlorides and phosgene. These particular polyphthalatecarbonates exhibit high levels of resistance to heat. A more preferred class of polyphthalatecarbonate resins are those derived from bisphenol A; terephthalic acid, isophthalic acid, or a mixture of isophthalic and terephthalic acids or isophthaloyl chloride, terephthaloyl chloride, or a mixture of isophthaloyl and terephthaloyl chloride; and phosgene. The most preferred polyphthalatecarbonate resin is derived from bisphenol A; phosgene; and a mixture of terephthaloyl dichloride and isophthaloyl dichloride wherein the terephthaloyl dichloride and isophthaloyl dichloride are present in a mole ratio of terephthaloyl dichloride to isophthaloyl dichloride of from about 5:95 to 95:5, more preferably the mole ratio of terephthaloyl dichloride to isophthaloyl dichloride being from about 6:94 to 50:50, and most preferably the ratio thereof being about 7:93.

Suitable silicone-polyimides can be made by effecting reaction between amine-terminated polydiorganosiloxane or "siliconediamine" having the formula:

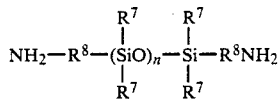

(VII)

aryldiamine having the formula:

$$NH_2R^9NH_2 \qquad (VIII)$$

with substantially equal molar amounts of aromatic bisanhydride, preferably aromatic bis(etheranhydride) of the formula:

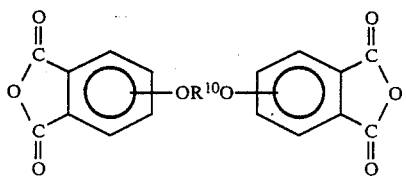

(IX)

and organic dianhydrides, such as pyromellitic anhydride, where $R^7$ is the same or different $C_{(1-14)}$ monovalent hydrocarbon radical, or $C_{(1-14)}$ monovalent hydrocarbon radical substituted with radicals inert during intercondensation, $R^8$ is preferably a $C_{(2-14)}$ divalent hydrocarbon radical, or $C_{(2-14)}$ divalent hydrocarbon radical substituted with radicals neutral during intercondensation, $R^9$ is a divalent $C_{(6-14)}$ arylene radical, $R^{10}$ is a divalent $C_{(6-30)}$ arylene radical, and n is an integer having an average value of 3 to 20 inclusive and preferably 5 to 15.

$R^8$ is preferably $C_{(1-4)}$ polyalkylene, and $R^{10}$ is preferably a divalent arylene radical selected from the class consisting of:

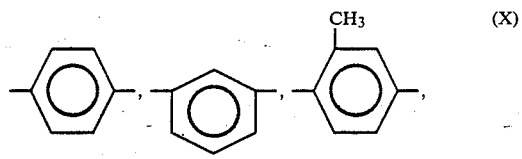  (X)

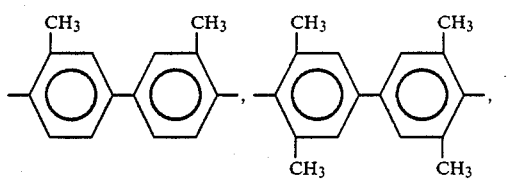

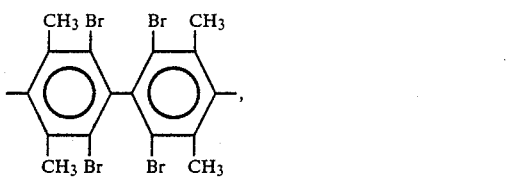

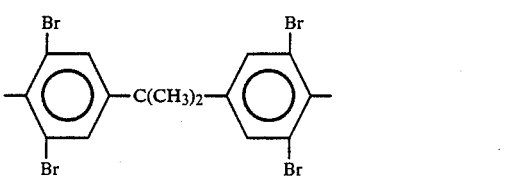

and

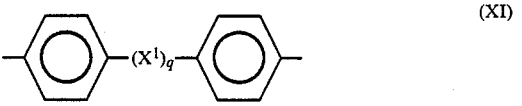  (XI)

$X^1$ is a member selected from the class consisting of:

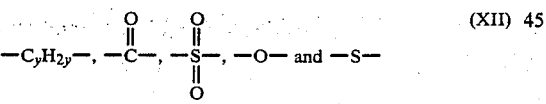  (XII)

q is equal to 0 or 1, and y is an integer equal to 1 to 5 inclusive.

Suitable silicone-polyimides can also be made which comprise by weight from about 10 to about 60 percent of polydiorganosiloxane, which silicone-polyimide has an elongation percent of at least 100 and a flexural modulus (psi) of from about 40,000 to 150,000 and is the intercondensation product of reaction of a mixture comprising oligomeric imide selected from the class consisting of:

(A) an amine-anhydride intercondensation mixture comprising at least two oligomeric imides which consist essentially of chemically combined repeat groups of aromatic bisanhydride intercondensed with a member selected from aryldiamine or siliconediamine and terminated with an intercondensed member selected from the class consisting of aromatic bisanhydride, aryldiamine, or siliconediamine, and (B) an amine-anhydride intercondensation mixture selected from:
  (i) a mixture comprising aryldiamine or siliconediamine and aromatic bisanhydride terminated oligomer of (A);
  (ii) a mixture comprising aromatic bisanhydride and aryldiamine, and siliconediamine terminated oligomer of (A);
  (iii) a mixture comprising aromatic bisanhydride and siliconediamine, and aryldiamine terminated oligomer of (A);

where the moles in (A) and (B) of aromatic bisanhydride, and/or of terminal intercondensed aromatic bisanhydride are substantially equivalent to the moles of aryldiamine, or silicone diamine, and/or terminal intercondensed siliconediamine or aryldiamine, and there is used to make the oligomeric intercondensation mixture of (A) or (B), from >0.5 to <1 mole, or >1 to <2 moles of aryldiamine or siliconediamine, per mole of aromatic bisanhydride.

The chemically combined arylimide units of the above silicone-polyimides are shown as follows:

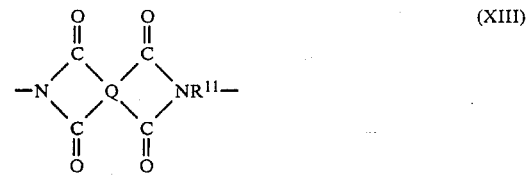  (XIII)

wherein $R^{11}$ is selected from the same or different $R^8$ or $R^9$ radicals, as previously defined, or a mixture thereof, Q is a tetravalent radical selected from:

  (XIV)

  (XV)

D is a member selected from:

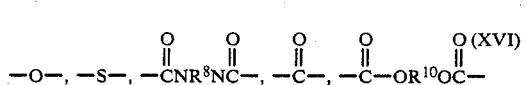  (XVI)

and $-OR^{10}O-$  (XVII)

and $R^{10}$ is a divalent radical selected from:

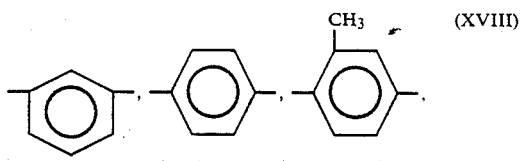  (XVIII)

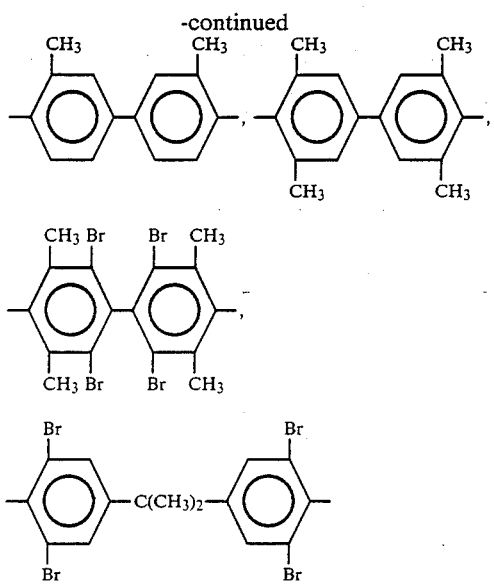

and divalent organic radicals of the general formula:

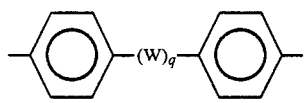
(XVIX)

W is a member selected from the class consisting of divalent radicals of the formula:

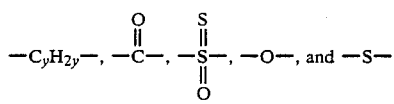
(XX)

and q and y are as previously defined.

Among the preferred arylimide units of formula (XIII), there are included aryletherimide units of the formula:

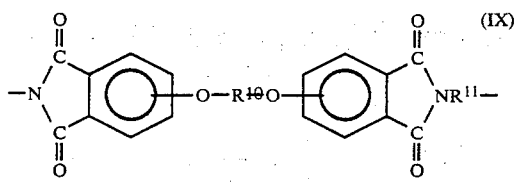
(IX)

where $R^{10}$ and $R^{11}$ are as previously defined.

Radicals included within $R^7$ of formula VII are, for example, $C_{(1-8)}$ alkyl radicals such as methyl, ethyl, propyl, butyl, pentyl, etc.; $C_{(6-13)}$ aryl radicals such as phenyl, tolyl, xylyl, anthryl; halogenated alkyl and aryl radicals such as chlorophenyl; cyanoalkyl radicals, for example, cyanoethyl, cyanobutyl, trifluoropropyl, etc. Radicals included within $R^8$ of formula VII are, for example, $C_{(1-8)}$ alkylene radicals such as methylene, dimethylene, trimethylene, tetramethylene, etc. and arylene radicals such as phenylene, tolylene, xylene, naphthalene, etc. Radicals included within $R^9$ of formula VII are, for example, phenylene, xylylene, tolylene, naphthylene.

Aromatic bisanyhydrides which can be utilized in the practice of the present invention are preferably aromatic bis(etheranhydride)s of formula IX. Some of the dianhydrides included within formula IX are, for example:

2,2'-bis-(4-(2,3-dicarboxyphenoxy)phenyl)propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride, etc.;
2,2-bis(4-(3,4-dicarboxyphenoxy)phenyl)propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy(benzene dianhydride;
1,4-bis(3,4-dicarboxyphenoxy)benzene dianhydride;
4,4'-bis(3,4-dicarboxyphenoxy(diphenylsulfone dianhydride;
4-(2,3-dicarboxyphenoxy)-4'(3,4-dicarboxyphenoxy)-2,2-diphenylpropane dianhydride, etc.

The dianhydrides of formula IX can be made in accordance with Webb, U.S. Pat. No. 4,116,980.

In addition to the preferred aromatic bis(ether anhydrides) of formula IX, there can be used other aromatic bisanhydrides either separately or in combination with such aromatic bis(ether anhydrides) as previously indicated. These aromatic bisanhydrides can be used at up to 50 mole percent based on total dianhydride.

Procedures for making the aminoorgano terminated polydiorganosiloxane of Formula VII are well known in the art. For example, aminoorganotetraorganodisiloxane can be equilibrated with an octoorganocyclotetrasiloxane, such as octamethylcyclotetrasiloxane, to increase the block length of the polydiorganosiloxane. The corresponding aminoorganotetraorganodisiloxane, such as aminobutyltetramethyldisiloxane can be made by the procedure shown by Prober, U.S. Pat. No. 3,185,719. Prober reacts allylcyanide with dimethylchlorosilane and then hydrolyzes the resulting cyanopropyldimethylchlorosilane in the presence of sodium bicarbonate to produce the 1,3-bis- -aminopropyltetramethyldisiloxane which is prepared by utilizing acrylonitrile in a manner similar to that shown for the production of aminobutyltetramethyldisiloxane utilizing allylcyanide.

Included within the aryldiamines of Formula VIII are, for example:
m-phenylene diamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;
4,4'-diaminodiphenyl ether;
1,5'-diaminonaphthalene;
3,3'-dimethylbenzidine;
3,3'-dimethoxybenzidine;
2,4-bis( -amino-t-butyl)toluene;
bis(p- -amino-t-butylphenyl)ether;
bis(p- -methyl-o-aminopentyl)benzene;
1,3'-diamino-4-isopropylbenzene;
1,2-bis(3-aminopropoxy)ethane;

m-xylylenediamine;
p-xylylenediamine;
2,4-diaminotoluene;
2,6-diaminotoluene.

The silicone-polyimide can be made by sequentially intercondensing at temperatures in the range of 100° C. to 300° C., the amine-terminated polydiorganosiloxane of formula VII and the aryl diamine of formula VIII with aromatic bisanhydride. In particular situations, a diamine mixture having up to about 10 mole percent of the silicone diamine mixed with aryldiamine, or up to about 10 mole percent of aryldiamine mixed with silicone diamine can be used if feasible without substantially affecting the improved flexibility characteristic in the final silicone-polyimide. A substantially inert organic solvent can be used to facilitate intercondesation. Suitable solvents are, for example, dipolar aprotic solvents, such as dimethylformamide, N-methyl-2-pyrolidone, cresol, orthodichlorobenzene, etc.

The sequential intercondensation of the aryldiamine and silicone diamine with the aromatic bisanhydride can be achieved in either a single container or in multiple containers.

In the "single pot" procedure, an off stoichiometric amount of either the aryldiamine, or silicone diamine, is intercondensed with the aromatic bisanhydride in the presence of an inert organic solvent to produce a mixture of polyimide oligomer chain stopped with either intercondensed diamine or aromatic bisanhydride. An excess of aromatic bisanhydride or diamine correspondent to the chain stopping units also can be present. The oligomer can be either a silicone polyimide, or an oligomer of intercondensed aromatic bisanhydride and aryldiamine. There is then added to the same pot, after the initial period of oligomer formation, the remaining diamine, which can be either the aryldiamine, or silicone diamine and optionally sufficient aromatic bisanhydride to achieve stoichiometry. There also can be added to the resulting intercondensation mixture, chain stoppers, such as phthalic anhydride or monofunctional arylamine such as aniline to control the molecular weight of the final silicone polyimide.

In the multiple pot procedure, aryldiamine oligomer and siliconediamine oligomer can be intercondensed with aromatic bisanhydride in separate containers. The multiple pot procedure can achieve satisfactory results in instances where two or more oligomers are required providing a substantially stoichiometric balance maintained between total aromatic bisanhydride and diamine.

Oligomer block size can vary depending upon the proportions of aryldiamine, or silicone diamine used, per mole of aromatic bisanhydride. For example, for a "three block", oligomer, a 4/3 ratio can be used, i.e. 4 moles of diamine for 3 of bisanhydride, as shown by the following equation:

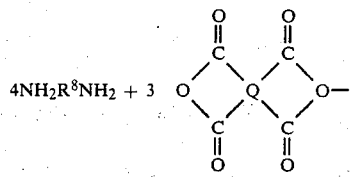

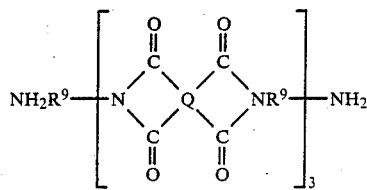

Reaction can continue until the intercondensation of anhydride and amine functional groups are achieved and the water of reaction is completely removed, such as by azeotroping from the reaction mixture. A typical polymerization catalyst can be used at 0.025 to 1.0% by weight, based on the weight of the reaction mixture, such as an alkali metal aryl phosphinate or alkali metal aryl phosphonate, for example, sodium phenylphosphonate.

The silicone-polyimide can be isolated by diluting the reaction mixture with a material, such as chloroform to reduce the solids level to about 10% and reprecipitating the resulting mixture in an organic solvent such as isopropanol. The resulting silicone-polyimide can thereafter be dried by conventional means, such as a vacuum oven.

The preferred siloxane polyetherimide copolymers employed in the blends of this invention may be prepared in a manner similar to that used for polyetherimides, except that a portion of all of the organic diamine reactant is replaced by an amine-terminated organosiloxane of the formula:

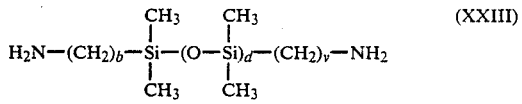

wherein b and v independently are integers from 1 to about 10, preferably from 1 to about 5, and d is an integer from 1 to about 40, preferably from about 5 to about 25.

The organic diamine of formula VII and the amine-terminated organosiloxane of formula VII may be physically mixed prior to reaction with the bis(ether anhydride)(s), thus forming a substantially random copolymer. Alternatively, block or alternating copolymers may be formed by forming prepolymers of sequential addition of reactants, as is well-known in the polymer arts.

Preferred amine-terminated organosiloxanes are those of the formula XXIII, in which b and v are each 3, and which have a molecular weight distribution such that d has an average value ranging from about 9 to about 20.

The diamine component of the siloxane polyetherimide copolymers generally contains from about 20 to 50 mole percent of the amine-terminated organosiloxane of formula XXIII and from about 50 to 80 mole percent of the organic diamine of formula VIII. In preferred copolymers, the diamine component contains from about 25 to about 40 mole percent, most preferably about 30 mole percent of the amine-terminated organosiloxane.

The siloxane polyetherimide copolymers used in the blends of this invention may be prepared by any of the procedures conventionally used for preparing polyetherimides. A present preferred method of preparation is described in U.S. Pat. No. 4,417,044, which is incorporated herein by reference.

The blends of the present invention comprise (a) a brominated polycarbonate resin present at a level of about 20 percent to about 80 percent by weight of the blend; preferably at a level of from about 30 to 50 percent by weight thereof; more preferably at a level of from about 35 percent to about 45 percent by weight thereof; and most preferably at a level of about 40 percent by weight thereof; and (b) a polyphthalatecarbonate resin present at a level of from about 80 percent to about 20 percent by weight of the blend; preferably from about 70 percent to about 50 percent by weight thereof; more preferably at a level of from about 65 to about 55 percent by weight thereof; and most preferably at a level of about 60 percent by weight thereof. The polyphthalatecarbonate of the present invention is derived from (a) a dihydric phenol (b) a carbonate precursor and (c) phthalate composition. The phthalate composition is a dicarboxylic acid or halide salt thereof selected from the group consisting of isophthalic acid, terephthalic acid, and mixtures thereof. These blends exhibit the combined properties of low flammability, high melt temperatures, excellent impact strength, and low smoke generation. These blends find particular utility as articles, such as panels, for aircraft interiors. Blends outside of these ranges lack the desired levels of these combined properties. These blends have several advantages over other flame retardant blends. Those advantages include a broad colorability range, their ability to be made into a white-white color and can be made to exhibit good flame resistance in articles having less than 90 mils thickness, for example 60 mils thickness. The blend may further comprise such additives as glass, pigments, fillers and other conventional additives.

Blends of the present invention exhibiting excellent flame resistance and low smoke generation comprise polymeric blends of (a) a brominated polycarbonate resin present at a level of from about 20 percent to about 77 percemt by weight of the blend; more preferably at a level of from about 35 percent to about 45 percent by weight thereof; and most preferably at a level of about 38 percent by weight thereof; (b) a polyphthalatecarbonate resin present at a level of from about 77 percent to about 20 percent by weight of the blend; more preferably present at a level of from about 62 percent to about 51 percent by weight thereof; and most preferably present at a level of about 57 percent by weight thereof; said polyphthalatecarbonate being derived from (i) a dihydric phenol, (ii) a carbonate precursor, and (iii) a phthalate composition; and (c) a silicone-polyimide present at a level of from about 10 percent to about 3 percent by weight of the blend; more preferably present at a level of about 6 percent to about 4 percent by weight thereof; and most preferably present at a level of about 5 percent by weight thereof. The presence of the silicone polyimide reduces the smoke generation of the blend.

It is contemplated that the polycarbonate/polyphthalatecarbonate/silicone-polyimide resin blends of the present invention may also include other additive materials such as fillers, stabilizers, plasticizers, flexibilizers, surfactant agents, pigments, dyes, reinforcements, flame retardants and diluents in conventional amounts.

Methods for forming polycarbonate/polyphthalatecarbonate/silicone-polyimide blends vary considerably. Prior art blending techniques are generally satisfactory. A preferred method comprises blending the polymers and additives such as reinforcements in powder, granular or filamentous form, extruding the blend, and chopping the extrudate into pellets suitable for molding by means conventionally used to mold normally solid thermoplastic compositions.

The blends of the present invention have application in a wide variety of physical shapes and forms, including the use as films, molding compound, coatings, etc. When used as films or when made into molded products prepared therefrom, not only possess good physical properties at room temperature but they retain their strength and excellent response to work loading at elevated temperatures for long periods of time. Films formed from the blends of this invention may be used in applications where films have been used previously. Thus, the blends of the present invention can be used in automobile and aviation applications for decorative and protective purposes. The blends can also be used in laminated structures where films or solutions of the blend are applied to various heat-resistant or other type of materials such as asbestos, mica, glass fiber and the like, the sheets superimposed one upon the other, and thereafter subjecting the sheets to elevated temperatures and pressures to effect flow and cure of the resinous binder to yield cohesive laminated structures. Sheets may be made from the blends and subsequently thermoformed into panels for the interiors of aircraft. Panels and parts for aircraft interiors may also be formed by injection molding or the like.

The following examples illustrate specific blends in accordance with the present invention. It should be understood that the examples are given for the purpose of illustration and do not limit the invention. In the examples, all parts and percentages are by weight unless otherwise specified.

EXAMPLES

The examples set forth in Table I illustrate the good flame resistance of blends of brominated polycarbonate resins with polyphthalatecarbonate resins and further illustrate that the smoke generated by such blends is reduced by the incorporation of relatively small amounts of silicone-polyetherimide resin therein.

TABLE I

| | | | | | OSU | | | | | NBS | |
| | | | | | Heat[e] | Heat[f] | Heat[g] | Smoke[h] | Smoke[i] | Smoke[j] | Smoke[k] |
| Example | PPC[a] | PC[b] | SPI[c] | Th[d] | 2 min | Peak | Time | 2 min | Peak | SD 1.5 | SD 4.0 |
| --- | --- | --- | --- | --- | --- | --- | --- | --- | --- | --- | --- |
| 1 | 100 | — | — | .060 | 87 | 93 | 1.25 | 171 | 45 | — | — |
| 2 | — | 100 | — | .040 | M[l] | M | M | M | M | M | M |
| 3 | 90 | 10 | 06 | .060 | 56 | 68 | 1.46 | 159 | 177 | 10 | 27 |
| 4 | 60 | 40 | 06 | .068 | 18 | 44 | 2.53 | 56 | 222 | 06 | 32 |
| 5 | 58 | 42 | 05 | .093 | 02 | 59 | 3.86 | 29 | 531 | 03 | 34 |

TABLE I-continued

| | | | | | OSU | | | | | NBS | |
|---|---|---|---|---|---|---|---|---|---|---|---|
| Example | PPC(a) | PC(b) | SPI(c) | Th(d) | Heat(e) 2 min | Heat(f) Peak | Heat(g) Time | Smoke(h) 2 min | Smoke(i) Peak | Smoke(j) SD 1.5 | Smoke(k) SD 4.0 |
| 6 | 60 | 40 | — | .060 | 13 | 45 | 2.50 | 70 | 300 | 07 | 40 |

Amounts are in parts by weight.
(a)PPC is a polyphthaliatecarbonate derived from the reaction of bisphenol A with phosgene and a mixture of isophthaloyl chloride and terephthaloyl chloride. The phosgene and the mixture were in a mole ratio of 28:72 and the mixture contained 7 mole % terephthaloyl chloride and 93 mole % isophthaloyl chloride.
(b)PC is a polycarbonate obtained from the reaction products of a brominated dihydric phenol and phosgene, the dihydric phenol was 2,2'-(3,5,3',5'-tetrabromo-4,4'-hihydroxyphenyl)propane.
(c)SPI is a silicone-polyimide copolymer.
(d)Th is the thickness of the film in inches.
(e)Heat 2 Min represents the heat release in KW-min/M$^2$ as determined under the Ohio State Heat Release Test.
(f)Heat Peak represents the peak heat release in KW/M$^2$ as determined under the Ohio State Heat Release Test.
(g)Heat Time represents the time to peak in minutes as determined under the Ohio State Heat Release Test.
(h)Smoke 2 Min represents the smoke released during two minutes in Smoke Density-min/M$^2$ as determined by Ohio State Release Test.
(i)Smoke Peak represents the peak smoke released in SD/M$^2$ as determined by the OSU test.
(j)SD 1.5 represents the National Bureau of Standards smoke density as tested by ASTM F814-83, flaming mode, at 1.5 minutes.
(k)SD 4.0 represents the National Bureau of Standards smoke density as tested by ASTM F814-83, flaming mode, at 1.5 minutes.
(l)M indicates that the sample melted before meaningful numbers could be obtained.

What is claimed is:

1. A polymeric blend comprising:
   (a) an aromatic brominated polycarbonate resin present at a level of from 20 percent to about 77 percent by weight of said blend;
   (b) a polyphthalatecarbonate resin present at a level of from about 77 percent to about 20 percent by weight of said blend; and
   (c) a silicone-polyimide resin present at a level of about 10 percent to about 3 percent by weight of said blend.

2. The blend of claim 1 wherein said silicone polyimide comprises by weight from about 40 to about 90 percent of arylimide units chemically combined with from 10 to about 60 percent of polydiorganosiloxane, which silicone-polyimide has an elongation of at least 100 and a flexural modulus (psi) of from about 40,000 to 150,000 and is the intercondensation product of reaction of a mixture comprising oligomeric imide selected from the class consisting of:
   (a) an amine-anhydride intercondensation mixture comprising at least two oligomeric imides which consist essentially of chemically combined repeat groups of aromatic bisanhydride intercondensed with a member selected from aryldiamine or siliconediamine, and terminated with an intercondensed member selected from the class consisting of aromatic bisanhydride, aryldiamine, and siliconediamine; and
   (b) an amine-anhydride intercondensation mixture selected from:
      (i) a mixture comprising aryldiamine or siliconediamine and aromatic bisanhydride terminated oligomer of (a);
      (ii) a mixture comprising aromatic bisanhydride and aryldiamine, and siliconediamine terminated oligomer of (a);
      (iii) a mixture comprising aromatic bisanhydride and siliconediamine, and aryldiamine terminated oligomer of (a);
   where the moles in (a) or (b) of aromatic bisanhydride, of terminal intercondensed aromatic bisanhydride or mixtures thereof are substantially equivalent to the moles of aryldiamine, or silicone diamine, terminal intercondensed siliconediamine or aryldiamine or mixtures thereof, and there is used to make the oligomeric interconsation mixture of (a) and (b), from >0.5 to <1 mole, or >1 to <2 moles of aryldiamine or siliconediamine, per mole of aromatic bisanhydride.

3. The blend of claim 2 wherein said polydiorganosiloxane is polydimethylsiloxane, said aromatic bisanhydride is BPA dianhydride, and said aryldiamine being meta-phenylenediamine.

4. A polymeric blend comprising:
   (a) a brominated polycarbonate resin derived from:
      (i) a brominated dihydric phenol; and
      (ii) a carbonate precursor, said brominated polycarbonate resin being present at a level of from about 20 to 77 percent by weight of said blend;
   (b) a polyphthalatecarbonate resin derived from:
      (i) bisphenol A
      (ii) a carbonate precursor and
      (iii) a phthalic acid selected from the group consisting of terephthalic acid, isophthalic acid and mixtures thereof, said polyphthalatecarbonate resin being present at a level of from about 20 to 77 percent by weight of said blend; and
   (c) a silicone-polyimide present at a level of from 3 to 10 percent by weight of said blend.

5. The blend of claim 4 wherein said brominated dihydric phenol is 2,2-(3,5,3',5'-tetrabromo-4,4'-dihydroxyphenyl)propane.

6. The blend of claim 1 wherein said brominated polycarbonate is derived from:
   (a) a brominated dihydric phenol; and
   (b) a carbonate precursor.

7. The blend of claim 2 wherein said polyphthalatecarbonate is derived from:
   (a) bisphenol A;
   (b) a carbonate precursor; and
   (c) a phthalate composition selected from the group consisting of terephthalic acid, isophthalic acid and mixtures thereof.

8. The blend of claim 1 wherein said silicone polyimide is a silicone polyetherimide.

9. The blend of claim 4 wherein said silicone polyimide is a silicone polyetherimide.

10. The blend of claim 1 wherein said brominated polycarbonate resin is present at a level of from about 35 percent to about 45 percent by weight thereof, said polyphthalatecarbonate resin is present at a level of from about 62 percent to about 51 percent by weight thereof, and said silicone-polyimide resin is present at a level of from about 6 percent to about 4 percent by weight thereof.

11. The blend of claim 1 wherein said brominated polycarbonate resin is present at a level of about 38 percent by weight thereof, said polyphthalatecarbonate resin is present at a level of about 57 percent by weight thereof, and said silicone-polyimide resin is present at a level of about 5 percent by weight thereof.

12. The blend of claim 4 wherein said brominated polycarbonate resin is present at a level of from about 35 percent to about 45 percent by weight thereof, said polyphthalatecarbonate resin is present at a level of from about 62 percent to about 51 percent by weight thereof, and said silicone-polyimide resin is present at a level of from about 6 percent to about 4 percent by weight thereof.

13. The blend of claim 4 wherein said brominated polycarbonate resin is present at a level of about 38 percent by weight thereof, said polyphthalate-carbonate resin is present at a level of about 57 percent by weight thereof, and said silicone-polyimide resin is present at a level of about 5 percent by weight thereof.

14. A composition comprising:
 (a) a polyphthalatecarbonate;
 (b) an aromatic brominated polycarbonate; and
 (c) a silicone-polyimide.

15. The composition of claim 14 wherein said silicone-polyimide is a silicone-polyetherimide.

* * * * *